(12) United States Patent
Martí Ascencio et al.

(10) Patent No.: US 10,306,094 B2
(45) Date of Patent: May 28, 2019

(54) METHOD AND SYSTEM FOR TRACKING AND AUTHENTICATING ARTICLES

(71) Applicants: Santiago Martí Ascencio, Naucalpan (MX); Herman Miklautsch, Zapopan (MX); Claudia Virginia Félix Martínez, Zapopan (MX); Luis Fernando Martínez Íñiguez, Zapopan (MX)

(72) Inventors: Santiago Martí Ascencio, Naucalpan (MX); Herman Miklautsch, Zapopan (MX); Claudia Virginia Félix Martínez, Zapopan (MX); Luis Fernando Martínez Íñiguez, Zapopan (MX)

(73) Assignee: Martex Potosí, S.A. de C.V., San Luis Potosí, SL (MX)

( * ) Notice: Subject to any disclaimer, the term of this patent is extended or adjusted under 35 U.S.C. 154(b) by 0 days.

(21) Appl. No.: 15/942,219

(22) Filed: Mar. 30, 2018

(65) Prior Publication Data
US 2018/0227458 A1 Aug. 9, 2018

Related U.S. Application Data

(63) Continuation-in-part of application No. 14/965,641, filed on Dec. 10, 2015, now abandoned.
(Continued)

(51) Int. Cl.
*G06K 19/06* (2006.01)
*H04N 1/23* (2006.01)
(Continued)

(52) U.S. Cl.
CPC ......... *H04N 1/233* (2013.01); *G06K 19/0614* (2013.01); *G06Q 10/00* (2013.01);
(Continued)

(58) Field of Classification Search
CPC .......... G06F 21/31; G06F 21/32; G06F 21/45; G06Q 20/354
(Continued)

(56) References Cited

U.S. PATENT DOCUMENTS 6,042,005 A * 3/2000 Basile ................. G06Q 20/346
                                                    235/382
6,119,943 A    9/2000 Christy
(Continued)

OTHER PUBLICATIONS

Office action for U.S. Appl. No. 14/965,641, dated Apr. 21, 2017, Martí Ascencio et al., "Method and System for Tracking and Authenticating Articles", 10 pages.

*Primary Examiner* — Kevin Kim
(74) *Attorney, Agent, or Firm* — Lee & Hayes, P.C.

(57) ABSTRACT

The present invention relates to a method and system for tracking, issuing, and authenticating gear or articles, such as uniforms, badges, equipment, weapons, etc, for use in law enforcement or other official capacity. An authentication system retrieves encoded information read by a reader from a plurality of different markers. A database is queried to retrieve biometric data corresponding to each marker whereby the biometric data is displayed on a display. A uniform having a computer-readable marker visible under ultraviolet light and an additional marker. A system for issuing one of the articles by authenticating an officer and storing the identity and encoded information in a database. An apparatus for applying a plurality of markers by way of a conveyor belt conveying the article by an ink jet printer and a laser engraver.

22 Claims, 6 Drawing Sheets

Related U.S. Application Data

(60) Provisional application No. 62/090,217, filed on Dec. 10, 2014.

(51) Int. Cl.
*H04N 1/32* (2006.01)
*H04N 1/00* (2006.01)
*G06Q 10/00* (2012.01)
*G06Q 10/08* (2012.01)
*G06Q 50/26* (2012.01)

(52) U.S. Cl.
CPC ......... *G06Q 10/087* (2013.01); *H04N 1/0057* (2013.01); *H04N 1/00278* (2013.01); *H04N 1/00702* (2013.01); *H04N 1/32144* (2013.01); *G06Q 50/26* (2013.01); *G06Q 50/265* (2013.01)

(58) Field of Classification Search
USPC ............................... 340/5.8, 5.82, 5.83, 5.86
See application file for complete search history.

(56) References Cited

U.S. PATENT DOCUMENTS

| | | | |
|---|---|---|---|
| 7,319,395 | B2 | 1/2008 | Puzio et al. |
| 7,522,056 | B2 | 4/2009 | Roque |
| 8,406,480 | B2 | 3/2013 | Grigsby et al. |
| 8,659,431 | B2 | 2/2014 | Brown |
| 2004/0083371 | A1* | 4/2004 | Algazi .................... G06F 21/32 713/186 |
| 2004/0257231 | A1 | 12/2004 | Grunes et al. |
| 2006/0005235 | A1* | 1/2006 | Murakami .......... G06Q 20/341 726/9 |
| 2009/0212553 | A1 | 8/2009 | Herlin et al. |
| 2011/0274275 | A1 | 11/2011 | Seitz |
| 2012/0131828 | A1 | 5/2012 | August et al. |
| 2012/0146784 | A1 | 6/2012 | Hines et al. |
| 2012/0303149 | A1 | 11/2012 | Bollendorf et al. |
| 2013/0316736 | A1 | 11/2013 | Carmel-Veilleux et al. |
| 2014/0201094 | A1 | 7/2014 | Herrington et al. |
| 2014/0284385 | A1 | 9/2014 | Decoux et al. |
| 2014/0316738 | A1 | 10/2014 | Kim et al. |

* cited by examiner

METHOD AND SYSTEM FOR TRACKING AND AUTHENTICATING ARTICLES

RELATED APPLICATIONS

This application is a Continuation of U.S. application Ser. No. 14/965,641 filed Dec. 10, 2015, which claimed priority to U.S. Provisional Application No. 62/090,217, filed Dec. 10, 2014, the contents of both are herein incorporated by reference.

FIELD OF THE INVENTION

The present invention relates generally to tracking and authenticating articles. More particularly, the present invention relates to a method and system for tracking and authenticating issued gear or articles for use in law enforcement or other official capacity such as uniforms, badges, equipment, etc.

BACKGROUND OF THE INVENTION

Police officer impersonation presents a significant problem for law enforcement. Police officers typically have a respected position in society and the public is reliant on these officers in order to keep them safe from crime. As the public inherently trusts a law enforcement official, an impersonator is able to make demands without resistance. This impersonation erodes the public trust. Historically, society has relied on uniforms and badges to identify people of authority. Uniforms and badges were elaborate and difficult to reproduce and the capability of producing these was from secured manufacturers. In modern times, much of the equipment has been made available for purchase by the general public enabling imposters to obtain the necessary materials to commit such a crime.

U.S. Pat. No. 8,406,480 to International Business Machines Corp., herein incorporated by reference, discloses an officer showing a badge to a user who is unsure of whether the badge is actually legitimate. The user captures an image of the badge using a cell phone camera and transmits the image to a badge information service over the web. The badge information service includes databases containing badge information and issuing authority information. The badge information service uses this information to verify the particulars of the badge and the officer. Upon receipt of a request from the user, the badge information service analyzes the image against images stored in one or more databases. The badge information service determines, based on the image analysis, whether the badge presented by the officer is valid. If not, the badge information service informs the user that the badge appears to be invalid.

U.S. Pat. No. 7,522,056 to V.H. Blackinton & Co., Inc., herein incorporated by reference, discloses a badge including a badge body constructed and arranged to support one or more components of the badge, such as an officer's badge number, and indicia indicating the organization with which the officer is affiliated. The badge body is made of metal, and an RFID device is attached to the badge body. The RFID device includes a coil antenna and a processor in communication with the coil antenna arranged to function as an RFID transponder. At least one antenna-enhancing structure may be attached to the badge body and be adjacent the coil antenna so as to enhance an ability of the RFID device to communicate wirelessly with an RFID reader.

Although the aforementioned references provide improvements on the badge, police officers have been known to occasionally misplace or lose their badge. A person who finds the badge may still use the badge for illicit purposes as it is identical to an official badge. This is especially a problem if the person has acquired a facsimile uniform which is relatively easy to do. Furthermore, guards at checkpoints may assume the "officer" is legitimate as the imposter has a badge. Therefore, one object of this invention to at least provide a novel method and system for independently authenticating an official using multiple authentication criteria.

SUMMARY OF THE INVENTION

According to one embodiment of the invention, there is provided a system of authenticating an official comprising: a display; a processor; and a memory unit. The processor retrieves encoded information read by a reader from a plurality of markers on at least one article, each of the markers being different. The processor queries, over a network transceiver, a database stored on a server using the encoded information to retrieve biometric data corresponding to each marker. The biometric data is displayed on the display. If the processor detects a mismatch between the biometric data corresponding to each marker, a display shows a notification indicating the mismatch. The display may be touch enabled and the system may be portable. Optionally, it may further have a metal detector.

When the article is read, the processor transmits location identifying and time information to the server for recording in the database.

According to another aspect of the invention, a computer-implemented method comprising: retrieving encoded information read by a reader from a plurality of markers on at least one article, each of the markers being different; querying a database stored on a server using the encoded information; retrieving biometric data corresponding to each marker from the server; and displaying the biometric data on the display. In a case of a mismatch between the biometric data corresponding to each marker, a notification is displayed indicating the mismatch. The method may also transmit location identifying and time information to the server for recording in the database.

According to any aspect of the invention, the reader may be one or more of a barcode reader, a Quick Response reader, a black light reader, radio frequency reader, or a digital camera.

According to any aspect of the invention, the article may be a uniform or one or more of a badge, a flashlight, handcuffs, a vehicle key, eye protection, a riot shield, a baton, a personal video camera, boots, belts, gloves, a pepper spray, a conducted electrical weapon, another type of weapon, or a knife.

According to any aspect of the invention, the biometric data may be one or more of an institution identifier, a photograph, a name, a badge number, fingerprints, physical measurements, or retinal information.

Another aspect of the invention is a uniform having a computer-readable marker visible under ultraviolet light; and one or more additional computer-readable markers. The additional computer-readable markers may be one or more of a barcode, a two-dimensional barcode, a laser engraved code, or an radio frequency tag.

A further aspect of the invention is a system of issuing at least one piece of gear. The system has a display, a processor, and a memory unit comprising instructions to configure the processor to authenticate an identity of an officer; retrieve encoded information read by a reader from a plurality of markers on the gear, each of the markers being different; and transmit the identity of the officer and the encoded information over a network transceiver to a database stored on a server.

Another aspect of the invention is an apparatus of applying a plurality of markers to an article. The apparatus has a conveyor belt conveying an article past at least one coding device. The coding devices may be an ink jet printer applying at least a first marker to the article; and a laser engraver engraving at least a second marker to the article. The ink may be fluorescent under ultraviolet light. The two markers may be selected from one or more of a two-dimensional barcode, a conventional barcode, alphanumerical text, a pattern, and an identifiable graphic. The apparatus may optionally have one or more sensors to determine the location of the article on the conveyor belt. The apparatus may also have a digital camera to image the article following application of the first and second markers. The digital camera may take the images under a source of ultraviolet illumination. A computer system may generate two sets of unique codes for each marker and transmit them to the inkjet printer and laser engraver. The unique codes are stored in a database on the computer system or may be stored on a remove server. The markers may overlie each other.

BRIEF DESCRIPTION OF THE DRAWINGS

An embodiment will now be described, by way of example only, with reference to the attached Figures, wherein.

DETAILED DESCRIPTION OF THE EMBODIMENT

While the Background of Invention described above has identified particular problems known in the prior art, the present invention provides, in part, a new and useful application for tracking and authenticating gear or articles. Although the embodiments described herein below refer to an officer, the inventor contemplates that the method and system may be used for any official such as, but not limited to, a firefighter, security guard, emergency medical technician (EMT), doctor, nurse, orderly, soldier, postal carrier, airline pilot, etc.

Figure 1A:
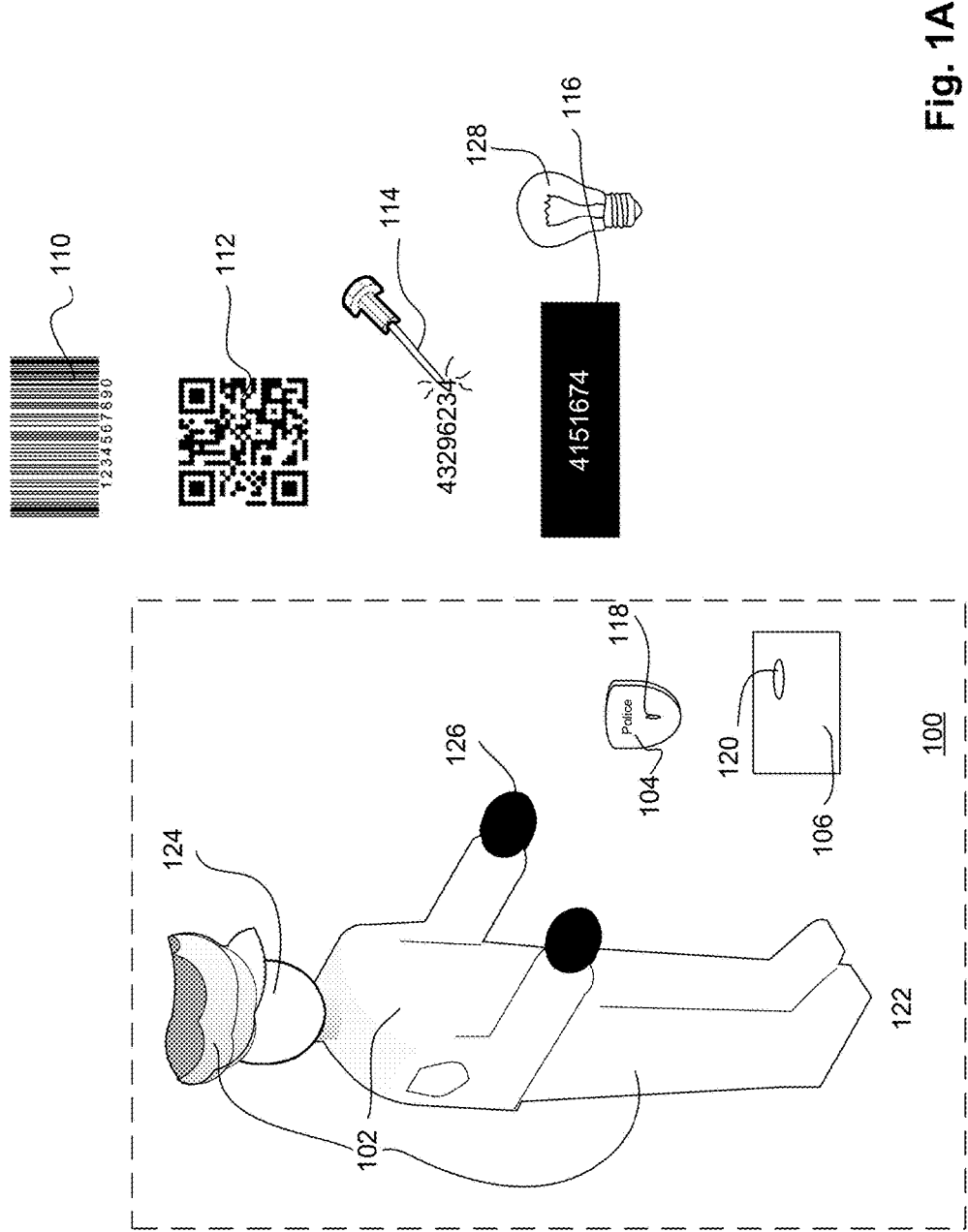
FIG. 1A shows a selection of gear and a plurality of authentication codes.

FIG. 1A shows a set of gear 100 for an officer comprising a uniform 102, a badge 104, and a piece of equipment 106. Other gear or equipment (not shown) may comprise a flashlight, handcuffs, vehicle keys, eye protection, riot shields, other weapons, personal video camera equipment, boots, belts, gloves, and/or weapons such as pepper spray, Taser conducted electrical weapon, knives, etc. or any combination of equipment thereof. The uniform 102 comprises a hat, pants, and a shirt but additionally may include a coat (winter or otherwise), gloves, bullet proof vest, body armor, helmet, riot gear, etc. Each of the pieces of gear 100 are marked with a marker corresponding to a code as further disclosed below. Each of the markers comprise a sufficient number of digits or characters (or other complex pattern) to ensure a unique code for each of the officers in the population. Alternatively, in instances where a unique code is not required, the code may be shorter, such as codes associated with information common to a plurality of officers. For example, if the marker is associated with the precinct or region, the code may be shorter as there will be fewer precincts than the number of officers. If the system runs out of codes, the code may be automatically lengthened on new articles.

The uniform 102 has an optically encrypted security code 110 represented by a barcode allowing the validation of the authenticity of the corresponding garment. Scanning this code 110 shows the information of the article 100, such as the size of the garment and a picture. The scan may also show private or confidential information on the owner of the garment such as the fingerprints, home address, performance records, etc. This barcode 110 is typically placed under the pocket flap of a shirt or on the interior of the shirt to reduce the public exposure of this confidential information.

The uniform 102 also has a Quick Response (QR) code 112 placed on the exterior of the shirt. Optionally, this QR code 112 may be placed in other locations on the uniform 102. Scanning this two-dimensional code 112 shows the information for an institution associated with the officer as well as the officer's photograph, name, and badge number. The code 112 enables scanning by the general public using an application executing on a mobile phone 174 in order to verify the officer 122 and the authentication of the uniform 102. This permits a member of the general public to independently confirm the officer 122 is authentic for their own safety. Also, other pertinent information to confirm the authenticity of the officer may be displayed.

The uniform 102 may optionally be marked with a laser engraved serial number 114 in the fabric. This engraving may be done on several parts of the garment in order to identify and verify the person originally assigned a garment. Engraving the garment in several locations permits identification even if the whole garment is not recovered. Typically, the serial number 114 may be engraved on each sleeve, shirt back, each pant leg, and hat and the number of engravings is limited only by the laser engraving technology and the time to engrave.

The uniform 102 also optionally has a black light (BL) identification 116 where words, initials, or pictures are printed in a random manner on the fabric and which is not visible without the aid of a "black" light 128. The black light 128 is also known as an ultraviolet light and emits long wave (UV-A) ultraviolet light and not much visible light. The lamp 128 has an ultraviolet filter material, either on the bulb or in a separate glass filter in the lamp housing, which blocks most visible light and allows through UV light so the lamp 128 has a dim violet glow when operating. The UV light causes the ink to phosphoresce displaying the code. A digital camera (not shown) may optionally capture an image and optical character recognition (OCR) may be performed to recognize the code. The recognized code may then automatically be queried in a database 152. For a similar reason as the laser engraved serial number, the BL identification 116 permits identification even if the whole garment is not recovered. Since the BL identification 116 is not visible without the black light 128, it is less likely to be discovered and more difficult to duplicate by conventional printing methods. The ink may also be chemically identifiable further permitting forensic analysis. Optionally, the ink may phosphoresce only in response to a specific band of ultraviolet light and the ink may phosphoresce in a particular color. Alternatively, the ink may comprise quantum dots (QD) that shift a wavelength of incident light to a different wavelength based on the particle size in the ink.

The badge 104 and the piece of equipment 106 have a radio frequency identification (RFID) chip 118 placed within each of them. The RFID tag 118 in the badge 104 may or may not be the same as the RFID tag 120 in the piece of equipment 106. The RFID tag 120 is sealed within each of these devices and presents significant difficulty in removing it without damaging the badge 104 and/or the piece of equipment 106. The RFID tag 120 may also be placed within the piece of equipment 106 in such a manner that removal of the tag 120 renders the piece of equipment 106 inoperable. The RFID tag 118 and 120 are read using an RFID reader that transmits an interrogation signal. The RFID tag 118, 120 responds to the interrogation signal with a response signal encoded with the information present on the RFID tag 118, 120. Alternatively, the RFID tag 118 may be replaced with a Near Field Communication (NFC) tag and is readable by an NFC scanner present in many modern mobile phones 174.

Depending on the requirements of the security environment, different numbers of codes (e.g. barcode 110, QR code 112, serial number 114, BL code 116, badge RFID 118 and piece of equipment RFID 120) may be used to increase security and authenticity of the gear 100. In the most secure instance, all five of the codes may be used as all five of the codes would have to be replicated in order for a forgery to succeed. For less secure situations, fewer codes may be used. In order to provide increased security, a less secure code such as the QR code 112 may be paired with a more secure code such as a laser engraved code 114. The QR code 112 is assumed to be less secure due to the ability for someone to easily copy it using photographic or photocopying equipment. Optionally, one code may be overlaid on another code to increase the difficulty in copying. For example, the laser engraved code 114 may overlay the QR code 112. Photocopying both the codes would result in the laser engraved code 114 appearing but not being laser embossed/engraved indicating that the code is a forgery.

The officer 122 also has a number of biometrics recorded and stored on the database server 152. For example, images of the officer's face 124 and/or retinal information may be taken, fingerprints 126 may be recorded as well as measurements of the officer (shoulder width, waist size, inseam, etc).

Prior to having the gear 100 issued to the officer 122, the officer 122 may be registered into the system at a registration station 130. An image is taken of the officer 122 (typically the face of the officer 122) using a digital camera 134 which may comprise a charge-coupled device (CCD), CMOS, or other type of image sensor, a processor, memory, and a communication channel. Alternatively, the camera 134 is solely an image sensor and relies on the computing device 132 for processing and storing the image. Once the image of the officer 122 is captured, it is displayed to the registrar (not shown) in order to verify that the officer 122 is identifiable in the image. If not, then the registrar retakes the photograph. Optionally, an existing image may be retrieved from the database server 152 for comparison by the registrar. Alternatively, facial recognition may be performed and compared with an existing image in the database server 152.

The fingerprints of the officer 122 are also recorded using a fingerprint scanner 136. The fingerprint scanner 136 may use optical, ultrasonic, capacitive, or thermal technologies to capture the fingerprint data. The procedure for capturing a fingerprint using a sensor involves rolling or touching with the finger onto a sensing area, which according to the physical principle in use captures the difference between valleys and ridges. When a finger touches or rolls onto a surface, the elastic skin deforms. The quantity and direction of the pressure applied by the user, the skin conditions and the projection of an irregular 3D object (the finger) onto a 2D flat plane. The image of the fingerprint should preferably be consistent in the case of different types of fingerprint readers being used at different locations.

Optionally, the signature of the officer 122 may be recorded using a tablet computing device 138 or other type of digitizer at the registration station 130. Optionally, signature recognition may be further used to confirm the identity through comparison with the existing signature stored in the database server 152. The tablet computing device 138 may also record pressure information of the signature if the touch technology of the tablet is able to record this information. The pressure information may further be used to verify the signature.

Other documents such as registration forms may be scanned using a scanner 140 or entered by way of a keyboard, touch screen, or mouse (not shown). Additionally, the measurements of the officer 122 are also recorded at this time. Optionally, a 3D laser scanner may be used to obtain the precise measurements of the officer such as height, shoulder width, inseam, etc.

The camera 134, fingerprint scanner 136, digitizer 138, and scanner 140 are controlled by a registration computer 132. The registrar logs into the registration computer 132 using a username and password combination or other biometric methods of authentication. The registrar then activates each of the devices 134-140 by way of a graphical user interface displayed on a monitor connected to the registration computer 132. On activation, the biometric information is retrieved from each device 134-140 over a communication channel such as a universal serial bus (USB), Bluetooth®, or other type of communication channel. This biometric information is stored locally on the registration computer 132 until registration is complete. Once the registrar is satisfied that the biometric information is sufficiently recorded, the registrar initiates a secure biometric data transfer over a wired network connection and over the Internet 150 to a database server 152 (typically located in a police station or other secure location). The data may be secured using secure hypertext transport protocol (HTTPS) or other type of secure encryption such as a Virtual Private Network (VPN). Additionally, the location of the registration computer 132 is transmitted and recorded, which may comprise the address, phone number, precinct, GPS coordinates, or other such identifiable information. Optionally, the registrar information may also be transmitted and associated with the biometric data for auditing purposes.

Figure 2:
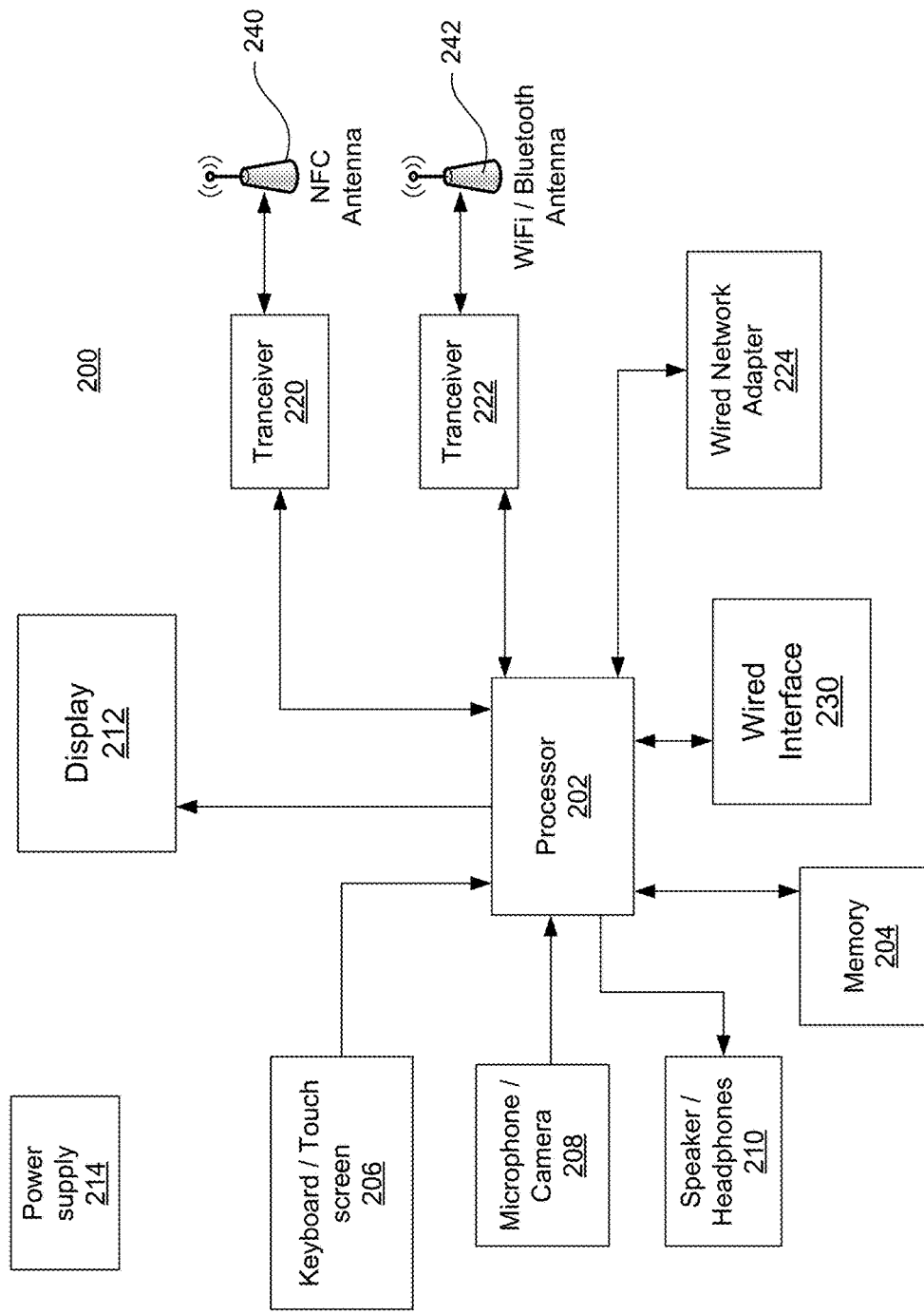
FIG. 2 shows an architecture of a computing device that may be used to implement various parts of the invention.

Turning now to the registration computer 132 and further described with reference to FIG. 2, the exemplary registration computer 200 has a processor 202 executing instructions from volatile or non-volatile memory 204 and storing data thereto. The registration computer 200 has a number of human-user interfaces such as a keypad or touch screen 206, a microphone and/or an additional camera 208, a speaker or headphones 210, and a display 212. A wired power supply 214 provides power to all the components of the registration computer 200.

The registration computer 200 has a keyboard or touch screen 206, and display 212 designed for ease of use. For example, the keyboard 206 may be sized for the user permitting them to type at an increased speed. Another example is that the touch screen 206 and display 212 may be large or have increased functionality such as being a multi-user, multi-touch screen. The keypad 206 could be a conventional keyboard found on most desktop computers or a soft-form keyboard constructed of flexible silicone material. The keyboard 206 could be a standard-sized 101-key or 104-key keyboard, a laptop-sized keyboard lacking a number pad, a handheld keyboard, a thumb-sized keyboard or a chorded keyboard known in the art. Alternatively, the registration computer 200 could have only a virtual keyboard displayed on a touch screen 206. The touch screen 206 can be any type of touch technology such as analog resistive, capacitive, ultrasonic, infrared grid, camera-based, or any other touch technology known in the art. The touch screen 206 could be a single touch, a multi-touch screen, or a multi-user, multi-touch screen. Alternatively, the microphone 208 may be used for input into the mobile device 200 using voice recognition.

If a touch screen 206 is present in the device, the display 212 is typically sized to be approximately the same size as the touch screen 206. The user(s) controls the information displayed on the display 212 using either the touch screen or the keyboard 206.

The registration computer 200 has a number of network transceivers coupled to antennas for the processor to communicate with other devices. For example, the registration computer 200 may have a near-field communication (NFC) transceiver 220 and antenna 240, and/or a WiFi®/Bluetooth® transceiver 222 and antenna 242. The registration computer 200 also may have a wired network adapter 224 such as Ethernet to communicate with the Internet 150. The registration computer 200 may have a wired interface 230 such as USB for connection to and communication with other devices such as the aforementioned biometric sensors. At least one of the network transceivers is able to communicate over the Internet 150 to the database server 152.

Once the biometric data is received by the database server 152, the database server 152 securely stores this data in the memory of the server 152. The database server 152 comprises similar components as the registration computer 132 such as a processor 202, memory 204, keyboard 206, power supply 214 and wired network adapter 224. However, the database server 152 may lack elements unnecessary for the operation of a server such as a display 212 or keyboard 206. The measurement data is then retrieved and used to place an order for a uniform and badge from the manufacturing plant(s) 154 using the measurements of the officer 122. The server 152 then proceeds to order the uniform and badge 104 and may optionally send the codes to be placed on the uniform to the manufacturer otherwise the manufacturer generates the codes. By only ordering a uniform 102 and badge 104 after registration, no additional gear 100 is produced reducing costs and preventing (or reducing the instance of) excess gear from being illicitly sold. Once the uniform 102 is produced, the uniforms 102 for a particular issuing facility are packaged together. Each package is provided with a package identifier comprising a random serial number in the form of a barcode associated by the database server 152 with the codes of the uniforms 102 contained therein. The packages may pass through a number of different distribution centers and/or secondary warehousing prior to reaching the issuing facility as discussed with further reference to FIG. 1C. At each point, the package identifier is scanned and the location of the package is updated with the database server 152. If a package goes missing, all the codes of the uniforms 102 are invalidated. An investigation may be started at the last known location where the package identifier was scanned.

The issuing facility receives the package and scans the package identifier. The database server 152 is updated to indicate that the uniforms 102 have arrived at the issuing facility. The issuing facility may be the same location as the registration facility or may be a different facility such as a precinct. The issuing computer 160 comprises similar elements as the registration computer 132 shown in FIG. 2 such as a processor 202, memory 204, keyboard 206, display 212, power supply 214, and wired network adapter 224. The issuing computer 160 is connected to a camera (or 2D or conventional barcode reader) 134, fingerprint sensor 136 as previously described. In addition, the issuing computer 160 is operatively connected to an RFID reader 156. When the issuing computer 160 receives a package, it is scanned using the camera 134 (or optionally using a barcode scanner, not shown). The encoded barcode is then converted to electronic data which is submitted to the database server 152. The database server 152 then transfers the codes related to the uniforms 102 to the issuing server 160. The issuing server 160 generates a list of officers 122 whose uniforms have arrived and an administrator contacts them. Alternatively, the issuing server 160 generates an email or other form of electronic communication which is sent to each of the officers 122 on the list.

Once the officer 122 arrives at the issuing facility, the issuer scans the fingerprints of the officer 122 using the fingerprint scanner 136 in order to confirm the identity. If the identity is confirmed, the issuer retrieves the assigned gear 100 for the officer 122. The issuer scans the barcode 110 and QR code 112 using the camera 134. The laser engraved serial number 114, and the BL identification 116 are optionally also entered at that time or may be entered prior to the arrival of the officer 122. The issuer also retrieves the badge 104 and scans the RFID tag 118 using the RFID reader 156. If the officer 122 has ordered a replacement uniform 102, then their existing badge 104 may be scanned. Alternatively for confirmation of identity, an image of the officer may be taken using the camera 134 and facial recognition compares this image to the data stored on the database server 152.

If the officer 122 is permitted to keep their piece of equipment 106 when not on duty, then the issuer also uses the RFID reader 156 to scan the RFID tag 120 inside the piece of equipment 106. If not, then the RFID tag 120 inside the piece of equipment 106 is scanned prior to the officer 122 going on duty. Note that this may result in the officer 122 receiving a piece of equipment 106 with a different RFID tag 120 for each shift. The check-out and check-in information for the piece of equipment tag 120 is retained on the database server 152 in order to verify which officer had a particular piece of equipment 106 in case an investigation on the appropriate use is necessary.

Figure 1B:
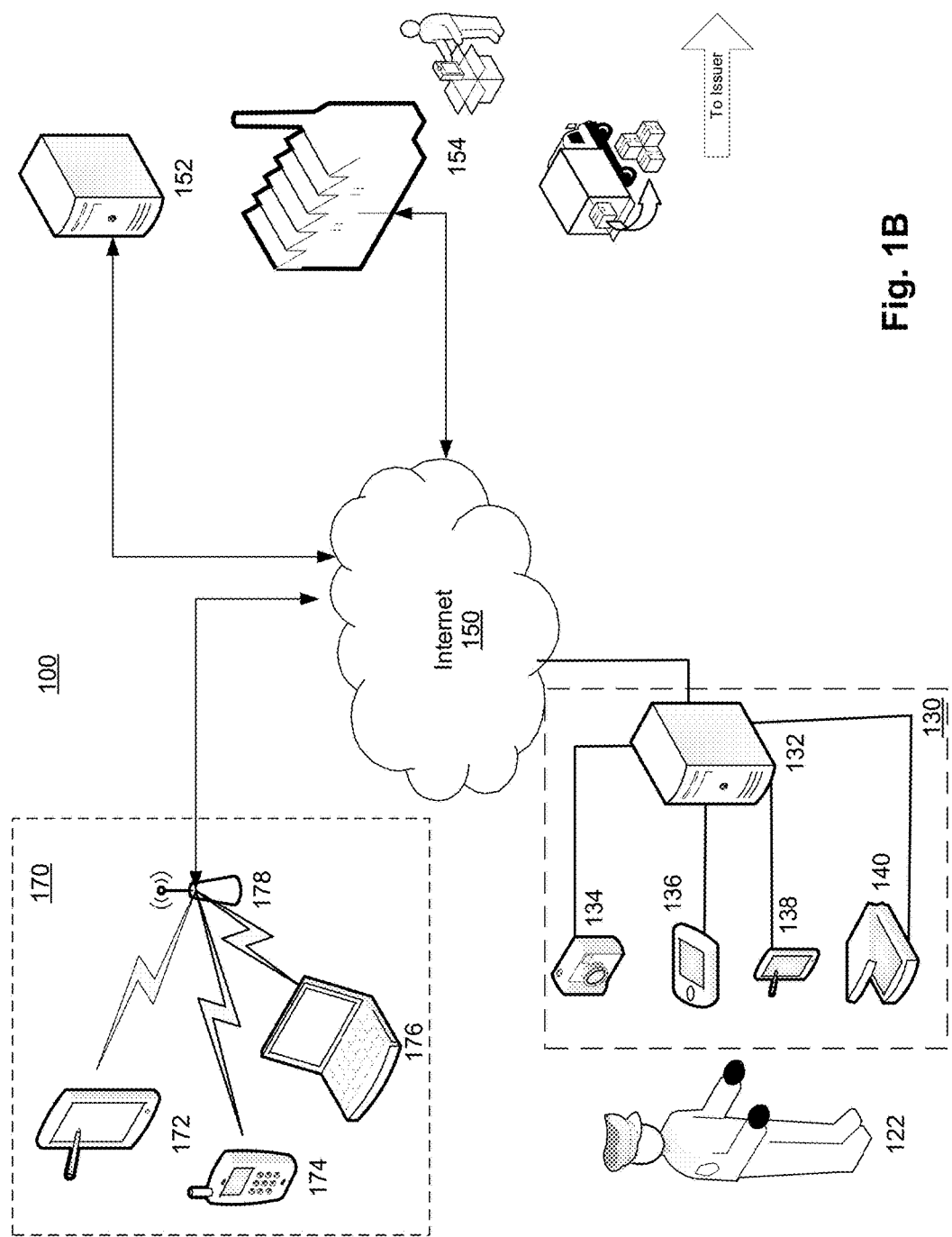
FIG. 1B shows an architecture of an authentication system for an officer.
Figure 1C:
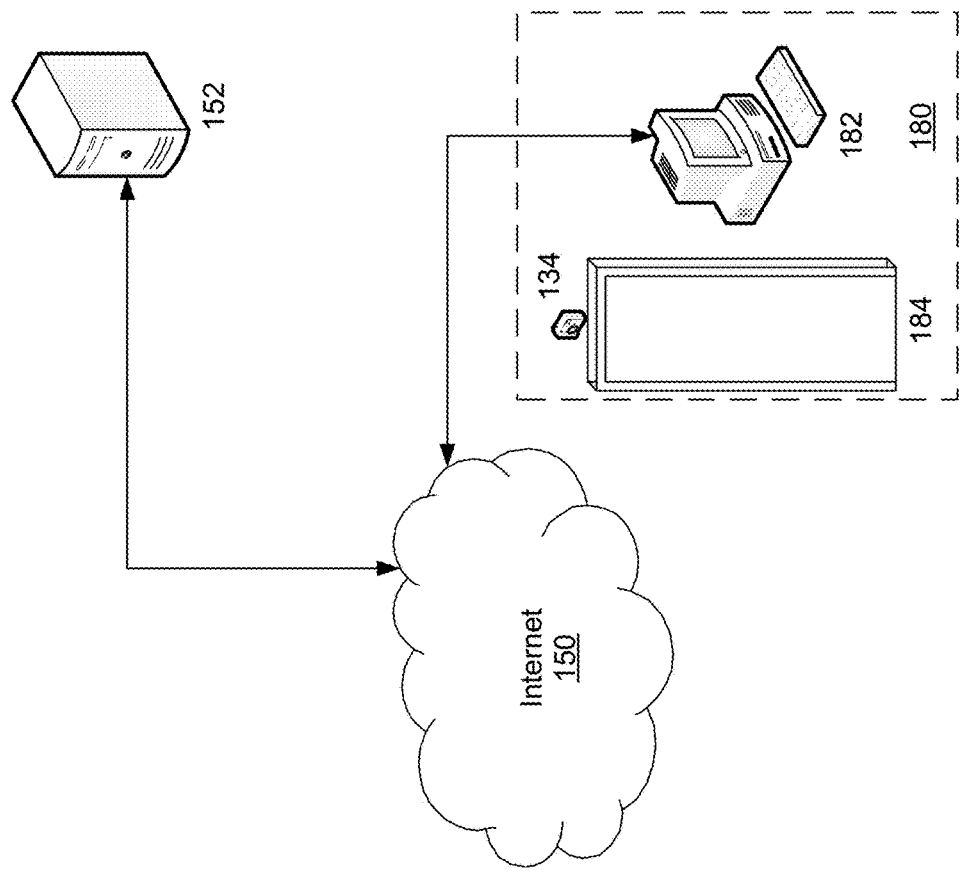
FIG. 1C shows an issuance station and a verification station for the officer.
Figure 1C:
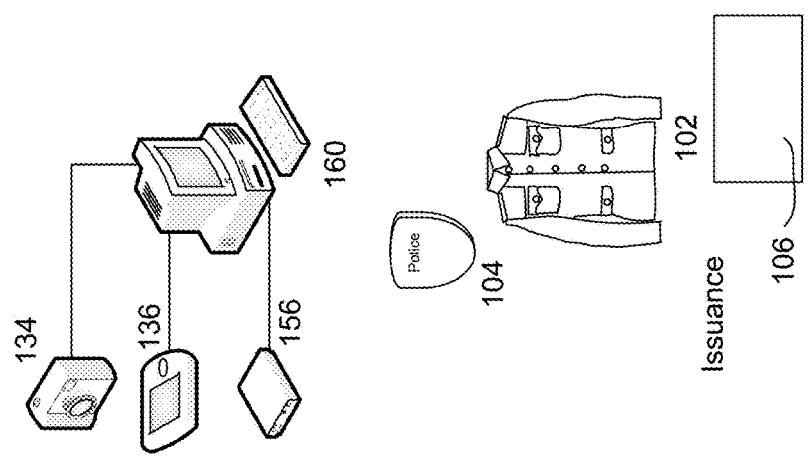

Once the officer 122 is on duty with their gear 100, the officer 122 may encounter a number of mobile verification stations 170 (as shown in FIG. 1B) or fixed position security checkpoints 180 (as shown in FIG. 1C). The mobile verification stations 170 may be a tablet 172, mobile phone 174, or laptop computer 176 executing a security verification application as further described below. Whereas the security checkpoints 180 are located at the entranceways of secure venues such as conference centers, airports, police stations, stores, etc. The security checkpoint 180 has a checkpoint computer 182 connected to a camera 134 and a gateway 184. The camera 134 takes images of everyone passing through the gateway 184. Optionally, the checkpoint computer 182 may perform facial recognition on the image and retrieve any officer 122 data from the database server 152. The information is displayed to the security personnel at the security checkpoint 180 for verification.

The gateway 184 detects metal on the person passing there through to allow the security checkpoint 180 to screen for weapons. The gateway 184 also transmits an RFID detecting interrogation pulse which reads the RFID tags 118, 120 present in the badge 104 and/or the piece of equipment 106. When an RFID tag 118 and/or 120 are detected, the checkpoint computer 182 queries the database server 152 to verify the officer 122 assigned the badge 104 and/or the piece of equipment 106. The checkpoint computer 182 displays an image of the officer 122 retrieved from the database server 152 to allow the checkpoint guards to verify the identity of the officer 122. The time, date, and location of the RFID tag 118 and/or 120 are transmitted to the database server 152. The guard may also indicate whether or not the officer 122 matches the photograph of the officer 122 on file.

If there is a mismatch between the badge 104 and the piece of equipment 106, then a warning is presented on the display of the checkpoint computer 182 and/or an alarm may sound. The checkpoint guard may require further verification by using a camera 134 to read the barcode 110, QR code 112, laser engraved serial code 114, and/or the BL identification code 116 using the methods previously described. If the checkpoint 180 does not have the additional sensors to read these codes, then the officer 122 is held in custody until a guard arrives with one of the mobile verification stations 170. The mobile verification stations 170 have a camera 134 in order to read the barcode 110 and/or QR codes 112. The mobile stations 170 may also have an RFID reader 156 and a blacklight light emitting diode (LED) 128 to enable true portable verification of the uniform 102, badge 104, and piece of equipment 106. The mobile stations 170 may be used to conduct spot checks during high security events.

Figure 3:
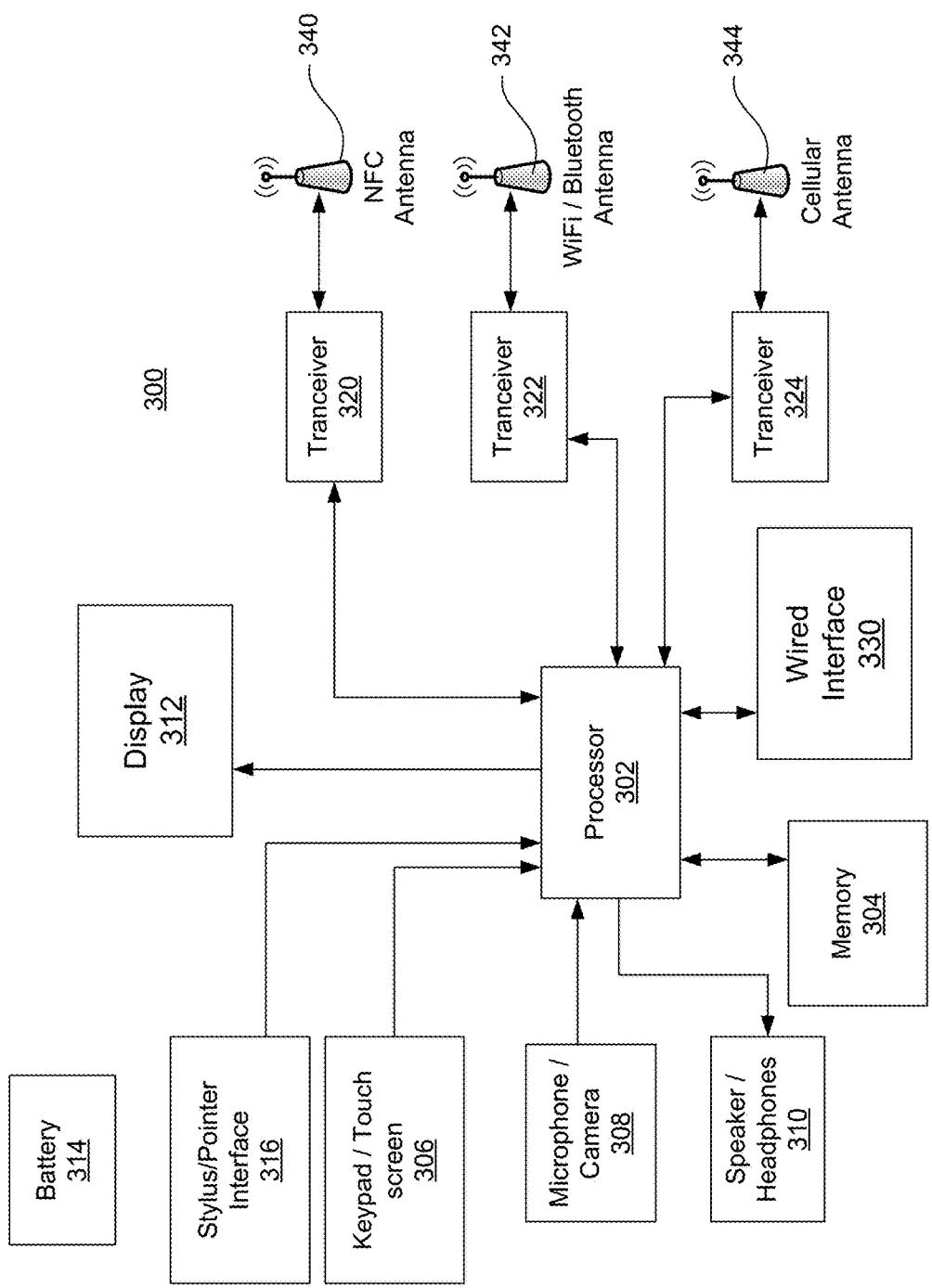
FIG. 3 shows an architecture of a mobile computing device that may be used to implement various parts of the invention.

The components of an exemplary mobile device 300 is further disclosed in FIG. 3 having a processor 302 executing instructions from volatile or non-volatile memory 304 and storing data thereto. The mobile device 300 has a number of human-computer interfaces such as a keypad or touch screen 306, a microphone and/or camera 308, a speaker or headphones 310, and a display 312. The mobile device has a battery 314 supplying power to all the components within the device. The battery 314 may be charged using a wired or wireless charging.

The keyboard 306 could be a conventional keyboard found on most laptop computers or a soft-form keyboard constructed of flexible silicone material. The keyboard 306 could be a standard-sized 101-key or 104-key keyboard, a laptop-sized keyboard lacking a number pad, a handheld keyboard, a thumb-sized keyboard or a chorded keyboard known in the art. Alternatively, the mobile device 300 could have only a virtual keyboard displayed on the display 312 and uses a touch screen 306. The touch screen 306 can be any type of touch technology such as analog resistive, capacitive, ultrasonic, infrared grid, camera-based, or any other touch technology known in the art. The touch screen 306 could be a single touch or multi-touch screen. Alternatively, the microphone 308 may be used for input into the mobile device 300 using voice recognition.

The display 312 is typically small-size between the range of 2 inches to 14 inches to enable portability and has a resolution high enough to ensure readability of the display 312 at in-use distances. The display 312 could be a liquid crystal display (LCD) of any type, plasma, e-Ink®, projected, or any other display technology known in the art. If a touch screen 306 is present in the device, the display 312 is typically sized to be approximately the same size as the touch screen 306. The user controls the information displayed on the display 312 using either the touch screen or the keyboard 306.

The mobile device 300 has a number of network transceivers coupled to antennas for the processor to communicate with other devices. For example, the mobile device 300 may have a near-field communication (NFC) transceiver 320 and antenna 340; a WiFi®/Bluetooth® transceiver 322 and antenna 342; a cellular transceiver 324 and antenna 344 where at least one of the transceivers is a pairing transceiver used to pair devices. The mobile device 300 optionally also has a wired interface 330 such as USB or Ethernet connection.

Figure 4:
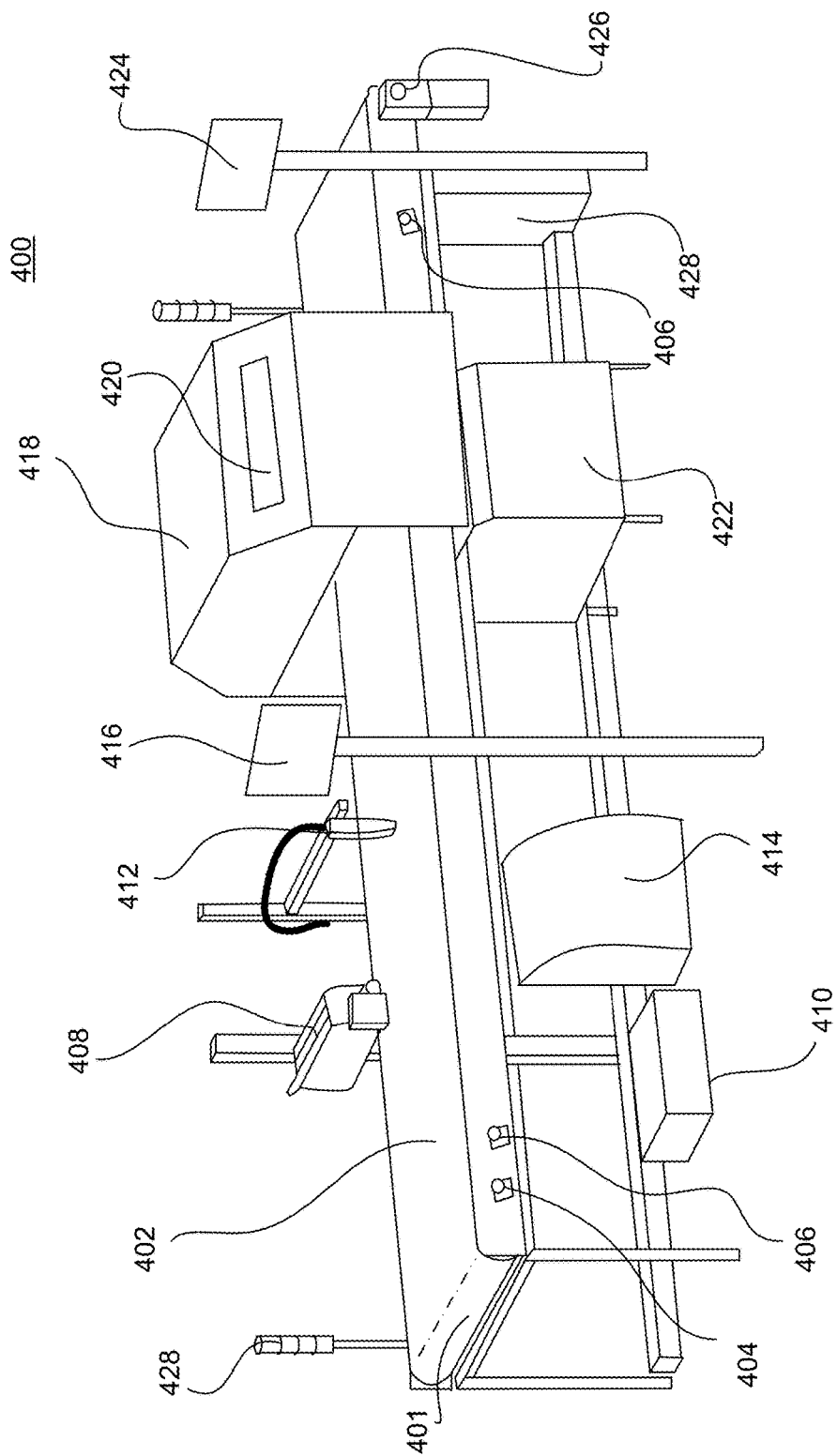
FIG. 4 shows an apparatus of applying markers to an article.

A coding system 400 depicted in FIG. 4 shows an exemplar manufacturing line for coding the gear. The coding system 400 is placed after the sewing and construction of the gear 100, in this case the uniform 102, but prior to packaging and shipping. The gear 100 may optionally be warehoused prior to entering the coding system 400.

A conveyor belt 402 conveys the gear 100 past various coding devices used to code the article. The conveyor belt 402 has a working height of approximately 90 cm and travels at a speed of between 20-25 m/min which equates to a maximum of one piece of gear 100 every 15 seconds. The conveyor belt 402 is approximately 10 feet long and has a modular structure to permit different coding devices to be added or removed from the coding system 400. The conveyor belt is controlled by way of a conveyor controller 428 that supplies power to the conveyor motor (not shown) and allows the operator to stop and start it. The conveyor belt 402 is started using a start button 404 and stopped using a stop button 406. An additional stop button 406 is placed at the opposite end of the conveyor belt 402 to permit quick stopping in the event of an emergency. The gear 100 is placed on the head end 401 of the conveyor belt 402 and as the belt rotates, the gear 100 passes under an ink jet printer 408, a laser engraver 412, and an ultraviolet enclosure 418. Optionally, the gear 100 may also pass under an RFID reader (not shown).

The ink jet printer 408 is controlled by an ink jet printer controller 410. In the present embodiment, the ink jet printer 408 is a Domino A420i ink jet printer, the technical specifications A420i/0414 are herein incorporated by reference, which is a highly reliable continuous ink jet printer with 99.75% availability and low "makeup" (or ink) consumption. The A420i is capable of high definition micro printing for discreet and high quality coding with 255 characters per line and up to 8 lines. In the present embodiment, the ink jet printer 408 uses UV ink. The controller 410 communicates with rack computer system 422 as further described below to obtain the code to be printed on the gear 100. A sensor (not shown) detects the gear 100 passing under the printer 410, causing the printer 410 to print the next available UV code 116 in one or more places on the gear 100.

The gear 100 then proceeds along the conveyor belt 402 until the gear 100 is under the laser engraver 412 controlled by a laser engraver controller 414. In the present embodiment, the laser engraver 414 is a Domino D-Series laser, the technical specifications DS/0113 herein incorporated by reference, which produces unlimited lines of text in any orientation suitable for graphics, and 2D QR codes. The laser engraver 412 may have a power range of 10 W, 30 W, or 60 W and is capable of printing between 800 and 2000 characters per second. The laser engraver 412 has a sensor (not shown) that detects the gear 100 in order to scribe the serial number 114 on it.

A touch monitor 416 is present on the coding system 400 near the beginning 401 of the conveyor belt 402. The touch monitor 416 is used by the operator to control the functionality of the conveyor belt and/or to indicate to the system which uniform is being marked.

The gear 100 then passes through an ultraviolet (UV) light enclosure 418 where the UV code 116 that was printed by the inkjet printer 408 is imaged by an Internet Protocol (IP) camera (not shown). The images taken by the IP camera are used for quality control purposes and displayed on the quality control touch monitor 424. A window 420 with a UV filter allows the operator to safely view the gear 100 within the enclosure 418.

A rack computer system 422 has an operating system running thereon and produces and aggregates production reports for quality control purposes. The rack computer system 422 may supply the codes to the laser engraver 412 and the inkjet printer 408. The rack computer system 422 also may store the images from the IP camera. The rack computer system 422 may additionally have security software such as antivirus and/or firewall software and may be secured from tampering. The rack computer system 422 is connected to the controllers 410 and 414 of the laser engraver 412 and inkjet printer 408 and collects and stores diagnostic information. All the data from the peripheral devices are stored in an SQL database for later query, auditing, and reporting.

Although the embodiments describe herein demonstrate the barcode 110, QR code 112, serial number 114, and BL code 116 as numerical representations of a code, the inventor contemplates that other information may be encoded such as alphanumeric text, and/or universal resource locators (URLs). Furthermore, the encoded information may be encrypted.

Although the embodiments described herein demonstrate that the serial number 114 and BL code 116 are alphanumerical text, the inventor contemplates that any image may be used such as a photograph, shapes, repeating patterns, or designs.

Although the embodiments herein describe an authentication system, the inventor contemplates that this system may also be used for secure inventory management.

The inventor further contemplates that medical information for the officer 122 may also be entered into the database server 152.

The computing devices 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Alternatively, components from computing device 200 may be combined with other components in a mobile device 200. Each of such devices may contain one or more of computing device, and an entire system may be made up of multiple computing devices communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made without departing from the scope of the claims and should not be limited by the preferred embodiments set forth in the examples, but should be given the broadest interpretation consistent with the description as a whole.

The above-described embodiments are intended to be examples of the present invention and alterations and modifications may be effected thereto, by those of skill in the art, without departing from the scope of the invention, which is defined solely by the claims appended hereto.

What is claimed is:

1. A method of providing secured gear to a user, the method comprising:
   obtaining, at a registration computer, biometric information from the user;
   securely transmitting, by the registration computer, the biometric information to a database server over a network;
   sending, by the database server, to a manufacturer, an order for the secured gear including a plurality of security codes based on the biometric information for placement on the gear;
   packaging, by the manufacturer, the secured gear in a package;
   providing, by the manufacturer, the package with a package identifier associated with the security codes;
   sending, by the manufacturer, the package to an issuing facility;
   obtaining, by an issuing server of the issuing facility, the plurality of security codes from the database server; and
   issuing, by the issuing facility, the secured gear to the user upon user authentication using the security codes.

2. The method according to claim 1, wherein obtaining, by the issuing server, the plurality of security codes from the database server comprises:
   scanning, by the issuing server, the package identifier;
   sending, by the issuing server, electronic data based on the package identifier to the database server; and
   receiving the plurality of security codes from the database server.

3. The method according to claim 1, further comprising:
   generating a list of users, by the issuing server, based on the received codes; and
   notifying, by the issuing server, the listed users that their gear have arrived.

4. The method according to claim 1, further comprising:
   scanning the package at various distribution centers; and
   updating the location of the package at the database server.

5. The method according to claim 1, wherein the package identifier comprises a random serial number in the form of a barcode associated with the security codes.

6. The method according to claim 1, further comprising transmitting information for a registrar, who operates the registration computer, with the biometric information for auditing purposes.

7. The method according to claim 1, further comprising if the package goes missing the plurality of secure codes are invalidated by the database server.

8. The method according to claim 1, further comprising updating, by the issuing facility, the database server subsequent to receiving the package.

9. The method according to claim 1, further comprising sending notification, by the issuing facility, to a plurality users in response to receiving the security codes based on the corresponding biometric information for the plurality of users.

10. The method according to claim 1, wherein authenticating the user comprises verifying biometric data at the issuing facility.

11. A system for providing secured gear to a user, the system comprising:
   a registration computer; a database server; a manufacturer; and an issuing facility;
   wherein the registration computer comprises a display, a processor, and a memory unit comprising instructions to configure the processor to:
      obtain biometric information from the user; and
      securely transmit, the biometric information to the database server over a network;
   wherein the database server comprises a processor, and a memory unit comprising instructions to configure the processor to:
      send, to the manufacturer, an order for the secured gear including a plurality of security codes based on the biometric information for placement on the gear;
   wherein the manufacturing facility:
      packages the secured gear in a package provided with a package identifier associated with the security codes; and
      sends the package to the issuing facility;
   wherein the issuing facility comprises an issuing server having a processor and a memory unit comprising instructions to configure the processor to obtain the plurality of security codes from the database server;
   and wherein the issuing facility issues the secured gear to the user upon user authentication using the security codes.

12. The system according to claim 11, wherein the instructions to configures the processor to obtain the plurality of security comprises instructions that configure the processor to:
   send electronic data based on the package identifier to the database server; and
   receive the plurality of security codes from the database server.

13. The system according to claim 11, wherein the a memory unit further comprises instructions to configure the processor to:
   generate a list of users based on the received security codes; and
   notify the listed users that their gear have arrived.

14. The system according to claim 11, wherein the manufacturer comprises a coding system for coding the gear subsequent to manufacturing and prior to shipping.

15. The system according to claim 14, wherein the coding system comprises:
   a conveyor belt conveying the article past a plurality of coding devices;
   the coding devices comprising:
      an ink jet printer applying at least a first marker to the article; and
      a laser engraver engraving at least a second marker to the article.

16. The system according to claim 14, wherein the ink jet printer applies ink that fluoresces under ultraviolet light.

17. The system according to claim 14, wherein the first marker is selected from at least one of a one-dimensional barcode, a two-dimensional barcode, alphanumerical text, a pattern, and an identifiable graphic.

18. The system according to claim 14, further comprising at least one sensor to determine a location of the article on the conveyor belt.

19. The system according to claim 14, wherein the second marker is selected from at least one of a one-dimensional barcode, a two-dimensional barcode, alphanumerical text, a pattern, and an identifiable graphic.

20. The system according to claim 14, further comprising a digital camera imaging the article following an application of the first and second markers.

21. The system according to claim 20, further comprising a source of ultraviolet illumination.

22. The system according to claim 14, wherein the first marker and second marker overlie each other.

* * * * *